United States Patent [19]

Peterson

[11] 4,121,270
[45] Oct. 17, 1978

[54] SERIES CAPACITOR SYSTEM WITH FORCE FIRING OF PROTECTIVE BYPASS DEVICE

[75] Inventor: Charles A. Peterson, Bloomington, Ind.

[73] Assignee: Westinghouse Electric Corp., Pittsburgh, Pa.

[21] Appl. No.: 767,185

[22] Filed: Feb. 9, 1977

[51] Int. Cl.² ............................................. H02H 7/06
[52] U.S. Cl. ...................................... 361/54; 361/16; 361/20
[58] Field of Search ....................... 361/16, 17, 15, 56, 361/57, 54, 55, 58, 272, 275, 20, 21

[56] References Cited

U.S. PATENT DOCUMENTS

| 3,319,121 | 5/1967 | Lee | 361/16 |
| 4,012,667 | 3/1977 | Ishida et al. | 361/16 |

OTHER PUBLICATIONS

"Series Capacitors in Power Systems," by Fahlen, et al. IEEE Transactions on Power Apparatus and Systems, vol. PAS-94 No. 3 May–Jun. 1975.

Primary Examiner—J D Miller
Assistant Examiner—Patrick R. Salce
Attorney, Agent, or Firm—G. H. Telfer

[57] ABSTRACT

In a series capacitor transmission system the protective bypass device has a force firing arrangement responsive to an applied signal for causing the series capacitor bank to be bypassed rapidly, such as within three cycles, for reducing subsynchronous oscillation effects on generating equipment connected with the transmission system. A capacitive potential device supplies power to energize a firing control circuit with a pulse transformer placing high frequency or pulse voltage across the protective device for rapid bypassing. The bypass device may be a protective spark gap as is normally present for protection of the capacitor bank against overvoltages.

3 Claims, 3 Drawing Figures

SERIES CAPACITOR SYSTEM WITH FORCE FIRING OF PROTECTIVE BYPASS DEVICE

BACKGROUND OF THE INVENTION

This invention relates generally to series capacitor installations in high voltage alternating current transmission lines.

Capacitor banks are connected in series in high voltage transmission lines carrying AC power to compensate for the inductance of the line. This compensation is desirable to improve the stability of the system, control load division between parallel lines, and provide other benefits. Since the capacitors are in series with the line, they are subject to overvoltages in case of a fault on the line or other excess current conditions as may result from switching surges. These conditions could result in damage to the capacitors. To avoid such damage, various forms of protective apparatus has been used in association with the series capacitors for the purpose of responding to indications of fault conditions to bypass and effectively remove the series capacitors from the line so they are not subjected to the fault conditions. The capacitors may be reinserted upon clearing of the fault.

A general form of such apparatus is to use a bypass device of substantial current carrying capacity, usually a spark gap or series of spark gaps, connected in a circuit branch across, or in parallel with, the series capacitors. The protective gaps arc over and bypass the capacitors rapidly upon the occurrence of a predetermined fault condition. Apparatus for causing the bypass to occur as well as to provide arc extinction and reinsertion of the capacitors in the line is generally known. Reference is made to the following patents for representative background information with respect to the purpose and utility of such protection systems and their general nature: Grove et al, U.S. Pat. Nos. 3,801,870, Apr. 2, 1974; Ringler et al, 3,816,800, June 11, 1974; and Peterson, 3,889,158, June 10, 1975.

The capacitor protective apparatus is thus normally present primarily for the purpose of protecting against damage to the series capacitors. An AC transmission line system is, however, subject to other conditions that may impose a hazard to parts of the system other than the capacitors. For example, it has been recognized that a generator supplying power to the transmission line is subject to the occurrence of subsynchronous currents in its armature or stator winding, concurrent with the normally present 60 Hz current, resulting in the production of pulsating torques on the generator rotor shaft at the corresponding slip frequency between 60 Hz and the subsynchronous frequency. The subsynchronous frequencies are the result of the use of series capacitor compensation which has a characteristic natural resonant frequency with the line.

This general problem of subsynchronous oscillation is potentially solvable by several distinct techniques including modification of the generator and its exciter or filtering of the undesired slip frequency. Another way is that which the above referred to U.S. Pat. No. 3,889,158 describes. In that patent it is recognized that if the capacitor bank is effectively removed from the system, the undesired subsynchronous oscillation cannot occur. But the voltage level at which sparkover of the capacitor bypass equipment occurs is important because, in general, the higher the sparkover voltage is, the greater the severity of mechanical shock. The concept of that patent is to employ a "dual sparkover" protection system with multiple bypass circuit branches of different sensitivity to overvoltages. One branch is primarily for capacitor protection and its sensitivity is related to the required level of protection for the capacitors themselves. Another branch is more sensitive than that required for capacitor protection and will respond to an overvoltage of lesser magnitude coincident with the occurrence of the subsynchronous oscillation condition. In this way, the severity of mechanical shocks occurring in the generator can, in some applications, be reduced to a tolerable level.

While such techniques are useful and effective, various transmission systems present a variety of specific circumstances and conditions so that the occurrence of subsynchronous oscillations is not uniform on all systems and the effectiveness as well as the overall cost-benefit ratio can vary to an extent that there is a need for alternate approaches and it is to such purpose that the present invention is directed.

SUMMARY OF THE INVENTION

In accordance with the present invention, a series capacitor transmission system has a protective bypass device with a force firing arrangement responsive to an applied signal for causing the series capacitor bank to be bypassed rapidly to reduce subsynchronous oscillation effects on generating equipment connected with the transmission system. A capacitive potential device supplies power to energize a firing control circuit with a pulse transformer placing high frequency voltage or voltage pulse across the protective device for rapid bypassing and also rapid reinsertion of the series capacitor bank. The bypass device may be a protective spark gap as is normally present for protection of the capacitor bank against overvoltages.

The invention therefore provides a way for the efficient and economical removal of the series capacitors from the system. The system responds rapidly to an initiating signal that may, for example, originate either automatically or manually at the power station at which the generator is located upon the occurrence of some condition at the generator indicative of subsynchronous oscillations. The system can be made to respond within a few cycles, such as two or three cycles of a 60 Hz system, after reception of the signal at the ground station proximate the series capacitors and their protective apparatus. Furthermore, the system provides a facility for controlling the period during which the capacitors remain bypassed, which is also desirably brief. Reinsertion can be accomplished within a further brief period and can be subject to what magnitude of line current is then occurring. All of these various functions can be achieved without impairing the performance and reliability of the equipment for its primary purpose of series capacitor protection.

As will be better understood from the following description of preferred embodiments, the bypass device is preferably the normally present bypass spark gap so that no additional bypass circuit branch is required. The means for force firing the bypass device includes a voltage supply utilizing the available transmission line power through a capacitive potential device. The firing control circuit permits application of energy from the voltage supply to the bypass device upon reception of a signal from a signal initiating means. The signal to the station is preferably modified at the ground station to produce a light beam received by the firing control circuit which can therefore be entirely proximate and immediately adjacent to the protective gap and the capacitors.

Greater flexibility of operation is provided by the present invention as compared with the system of U.S. Pat. No. 3,889,158. In that patent, capacitor bypass occurs upon sensing an overvoltage across the capacitor units. That voltage is necessarily set within a limited range. Other conditions that may produce subsynchronous oscillation will not cause the bypass to operate. The present invention permits application of signals resulting in a bypass upon occurrence of any of a variety of conditions.

The various elements of the system as disclosed may of course be varied in accordance with their indicated functions to result in other systems consistent with the concepts of this invention.

DESCRIPTION OF THE PREFERRED EMBODIMENTS

Figure 1:
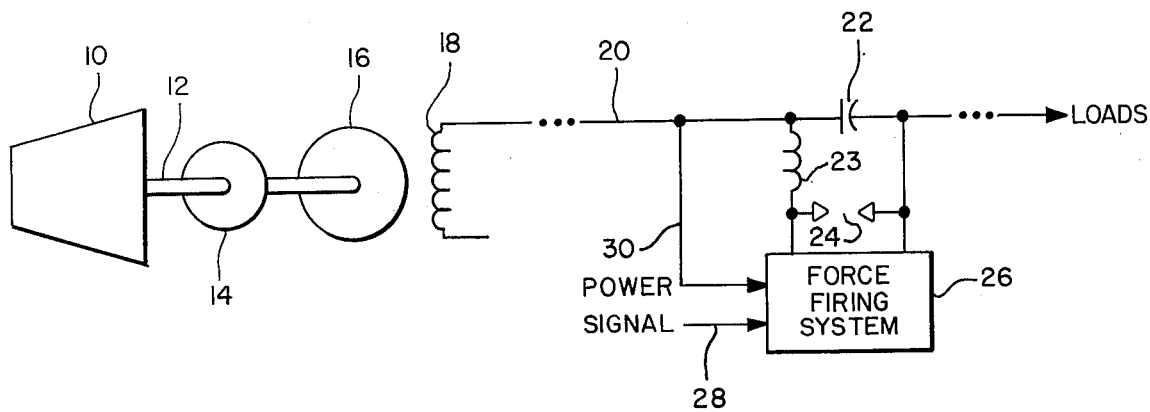
FIG. 1 is a general schematic diagram of a transmission system embodying the present invention.

In the general system of FIG. 1 a prime mover 10, such as a steam turbine, is connected by a shaft 12 with the rotors of an exciter 14 and an AC generator 16. The generator has an armature or stator winding 18 on which power is developed in accordance with known practice and the generating and transmission system may as usual be of a plurality of phases, such as three phase. For purposes of this general illustration a single line is shown from the generator as a transmission line 20 for ultimate connection with various loads. Various transformer and switching stages, not shown, would normally be present in the transmission line. Of pertinence to this invention is the fact that a series capacitor bank 22 is located in the transmission line 20.

It will be understood that the illustrated capacitor 22 represents a high voltage capacitor bank usually consisting of many individual capacitor units connected in a suitable series-parallel arrangement to obtain the desired capacitive reactance and current capacity. Such banks are frequently divided into a number of series connected segments and the illustrated capacitor 22 represents the overall arrangement. Such capacitive apparatus 22 is collectively related to a protective system which is here illustrated as a single spark gap device 24 as a bypass device in a circuit branch connected across or parallel with the illustrated capacitor. An inductive reactor 23 is connected in series with gap 24. The same transmission line may, and normally will, include additional capacitors, protective devices, and the related apparatus to be described with particular reference to this invention.

The spark gap device 24, sometimes referred to herein as an example of a bypass device, is one that upon the buildup of voltage across the spark gap elements results in the formation of a path of high current carrying capacity around the capacitor which effectively removes the capacitor from the system. As described in the background discussion, such protective devices and certain apparatus related to them have been previously known for purposes of protecting the capacitor units from overvoltage conditions.

In accordance with the present invention a force firing system 26 is connected across the spark gap 24 to cause firing of the spark gap upon the occurrence of a signal on line 28 that need not be related to any system condition that is hazardous to the capacitors 22 themselves. The applied signal would normally be the result of some condition occurring at the generator itself which shows the occurrence of, or a tendency for the occurrence of, subsynchronous oscillations which are desired to be avoided for protection of the rotating shaft 12. The signal may be formed as the result of some automatic monitoring apparatus at the generator or may be manually applied, such as for test purposes.

In addition, FIG. 1 shows generally that power is supplied to the force firing system 26 from the transmission line itself on line 30 and it is this power which the force firing system controllably and selectively places across the spark gap 24 to result in the bypass.

Figure 2:
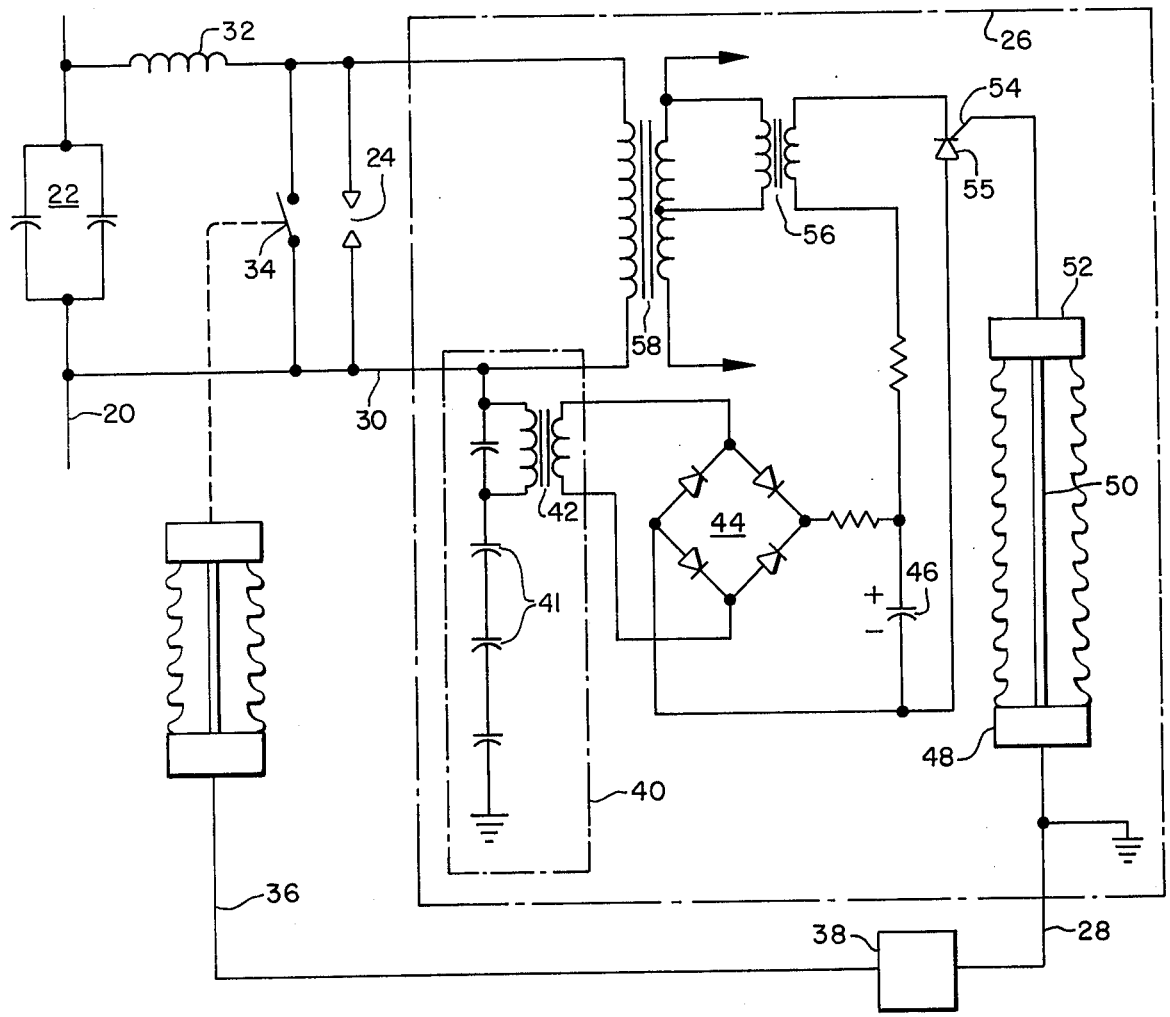
FIG. 2 is a schematic diagram of a force firing system for the arrangement of FIG. 1 in accordance with one embodiment of the present invention.

FIG. 2 illustrates a force firing system 26 suitable for use in the transmission system of FIG. 1. Here the series capacitor 22 is represented by a pair of parallel capacitor units although other variations as previously mentioned may be used. The main bypass spark gap 24 is shown in a circuit branch connected across the series capacitor which also includes a current limiting reactor 32 in accordance with known practice.

In addition a bypass switch 34 is connected across the spark gap device 24 and the capacitor 22 to provide any necessary backup protection or for the purposes of inspection and maintenance of the equipment. Switchers have been previously used in series capacitor protection equipment and would continue to have the same reasons for use in connection with practice of the present invention. They are not themselves fast enough to enable them to be closed for the purposes of the present invention, i.e., removal of the capacitors within only two or three cycles. Therefore, the illustrated switcher 34 is not a component whose functioning is directly related to the present invention, but is illustrated merely to describe that its presence and use for its normal purposes may be retained and also that it may be used in conjunction with the other elements to be described. Switcher 34 is electrically connected through line 36 to a ground control station 38.

A capacitive potential device 40 is connected between a line 30 connected to the transmission line and ground potential. Such potential devices are known and generally comprise a series string of power capacitor units 41, one of which has an induction transformer 42 connected thereacross. In most applications of capacitive potential devices, the potential transformer is across the capacitor unit remote from the source of high voltage. In the present case the potential transformer is across the capacitor unit close to the source of high voltage. Hence, this arrangement may be referred to as an inverted capacitive potential device. Basically the potential device serves as a voltage supply means for the force firing system.

The capacitive potential device is a desirable and preferred means for providing power to the force firing circuit. It permits operation of the system even if the protective gap is required to be fired at low line current, e.g., less than about half rated line current. For gap firing near or above rated line current, the force firing system could be powered directly from the line current.

Power from the potential device 40 is supplied to a rectifier bridge 44 to develop a DC voltage across a capacitor 46 which serves as an energy storage device that is maintained charged, but not affecting system operation, until a separate actuating signal is applied to the system. In accordance with a preferred embodiment of this invention, the actuating signal, which may be electrically supplied from the generator or a control station 38, is converted to a radiation signal, such as by the electrical signal on line 28 turning on a lamp (encoder 48), with the radiation signal passing through an optical transmission line 50, sometimes referred to as a light column, to a point where it is reconverted to an electrical signal (decoder 52) for effect on the force firing control circuit. The expression "force firing control circuit" refers to those elements within system 26 other than the potential device 40 and input elements 48, 50, and 52. The reason for preferring the use of such a light column 50, is that it is frequently present in series capacitor installations for transmissions of signals to the protective equipment in a thoroughly reliable manner from ground level to the apparatus that is located typically several feet in the air on a platform. The light column is within a long electrical insulator which provides thorough protection for it as well as for any air lines connected to the apparatus for performing pneumatic operations.

The light column 50 also permits complete electrical isolation between the ground control station and the protective apparatus which will, through the inverted potential device, have a high voltage such as about 500 kV.

In FIG. 2 it is generally shown that at the top of the light column is some means 52, referred to as a decoder, for reconversion of the radiation signal to an electrical signal. The electrical signal from decoder 52 is connected either directly, as shown, or indirectly to the gate control terminal 54 of a thyristor 55 that is in the normally open or off condition until closed by the incoming signal to complete a discharge path for the energy storage capacitor 46.

In this example, the illustrated discharge circuit for the energy storage capacitor 46 includes a primary winding of a transformer 56. The capacitive and inductive elements will create pulses at a frequency approximately equal to $\frac{1}{2}\pi\sqrt{LC}$, assuming low resistance. The secondary winding of transformer 56 is connected across part of the primary winding of an additional transformer 58 which in turn is inductively related to a secondary transformer winding directly connected across the spark gap device 24. Upon application of the control signal and discharge of the energy storage capacitor 46, there will rapidly occur across the spark gap 24 a high frequency pulse through pulse transformers 56, 58. This causes a high voltage buildup across the gap until it sparks over, thus effectively removing the capacitance from the system. Once the spark gap has sparked over from the pulse, the power current from the transmission line 20 and the follow discharge current of the arc will keep the gap conducting at least until the capacitors 22 are discharged through the gap with a characteristic underdamped ringdown frequency of about 500 to 1000 Hz and until the zero crossover of the line current and voltage, at which time it may be desirable to reignite the gap by a further high frequency pulse. Where the circuit resistance is relatively high, means can be used to generate an overdamped voltage wave or a single sharp pulse, instead of the LC ringing frequency.

Figure 3:
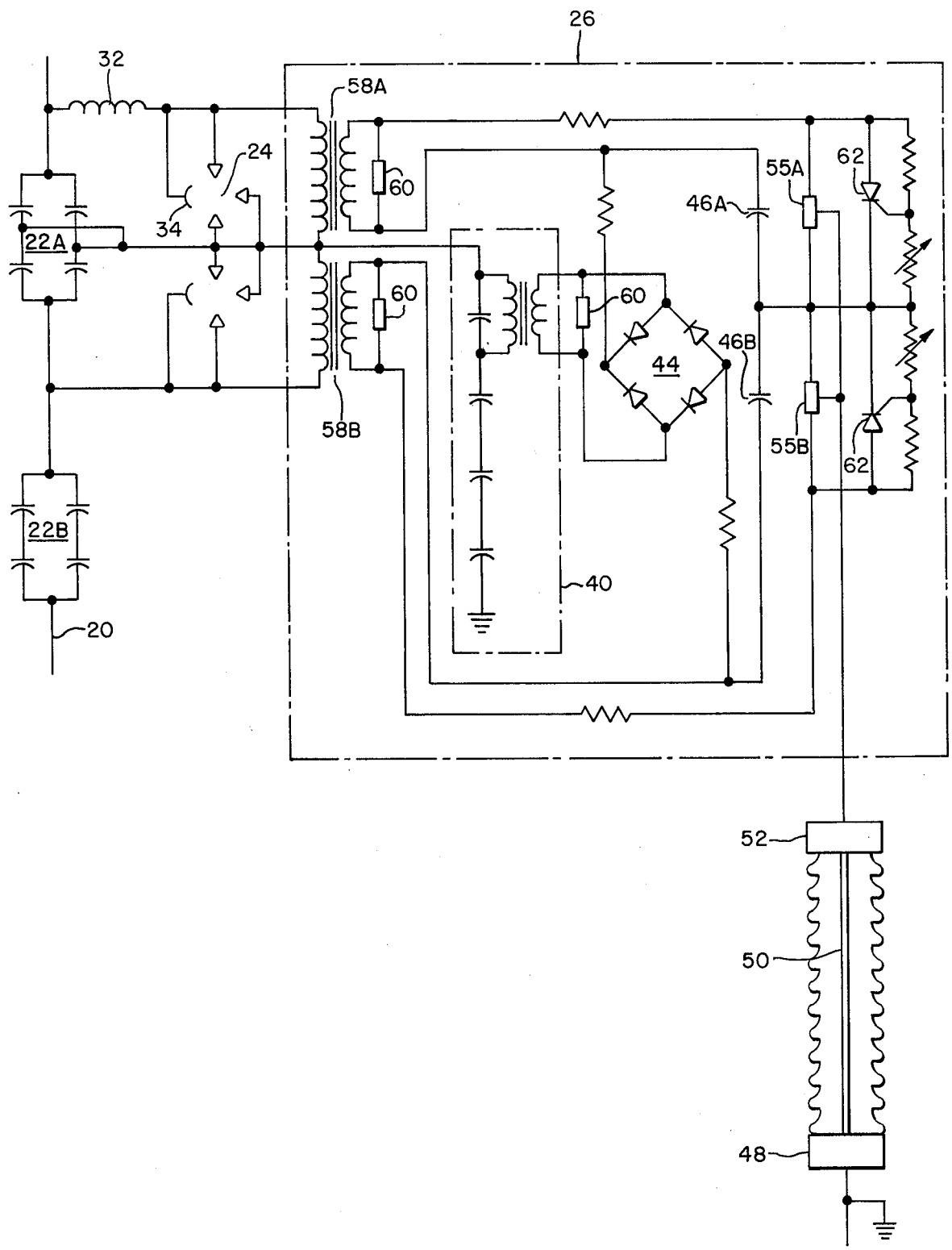
FIG. 3 is a further schematic diagram of an embodiment of the invention.

FIG. 3 shows a further illustration of the invention wherein the capacitors of an installation are divided into two blocks 22A and 22B. Each of the blocks 22A and 22B include a plurality of series and parallel capacitor units which represent the capacitive elements normally protected by a single protection system as shown by the spark gap elements 24 and gap switches 34. Each block has a force firing system 26 in accordance with this invention that requires only a single inverted capacitive potential device 40 and firing control circuit with some multiple elements for application of high frequency pulses through two pulse transformers to each half of the block 22A. The system has aspects of symmetry resulting from having the two pulse transformers 58A and 58B related to two energy storage capacitors 46A and 46B separately connected to the rectifier bridge 44. Separate switching components 55A and 55B are associated with each of the energy storage capacitors 46A and 46B and receive the initial electric signal from the decoder 52 associated with the light column. The switching elements 55A and 55B may be thyristors as shown in FIG. 2 or other solid state switching elements. The additional elements 60 shown across the windings of the pulse transformers and the input to the diode bridge are surge arresters to suppress transients.

Additional thyristor elements 62 may be provided with additional driving circuit elements so that they may be used for overvoltage triggering or for any other reason where it is desired to fire the gaps from the platform level. In this respect they may replace the extra protective gap of the above referred to U.S. Pat. No. 3,889,158. Hence, the present invention readily permits the addition of further control functions.

In FIG. 3, capacitor group 22B would also be provided with like apparatus including gaps 24, transformers 58A and 58B, and force firing circuit 26. While the adjacent group may also have a separate capacitive potential device 40, it is preferred to use a single capacitive potential device for the apparatus of both groups 22A and 22B, i.e., with one string of capacitors associated with windings of two induction transformers. The description herein will make apparent the apparatus can be modified by those skilled in the art without departing from the basic concepts of forced gap firing in accordance with this invention.

The dependence of the system upon repeated pulsing to maintain gap sparkover means that the gap will be extinguished in the absence of such pulses which therefore provides a built-in means of rapid reinsertion of the capacitors into the system. Timing elements may be employed to determine the number of pulses applied and the total gap firing characteristic. The system can be monitored by the use of a pneumatic sparkover counter system which will confirm and count the number of times the gap sparks over and which may be constructed in accordance with past practice wherein an air blast is used for arc extinction as described in above referred to U.S. Pat. No. 3,816,800.

It is therefore seen that the present invention offers a system which effectively minimizes subsynchronous oscillation effects on generating equipment without impairing operation of series capacitors and their protective equipment.

I claim:

1. A series capacitor transmission system, with the capability of rapidly bypassing the series capacitor for avoiding subsynchronous oscillation effects on generating equipment connected with the transmission system, comprising:
- a capacitor connected in series in an alternating current transmission line;
- a bypass device connected in a circuit branch across said capacitor;
- means for firing said bypass device including
  - (a) voltage supply means,
  - (b) a bypass device firing control circuit for permitting application of energy from said voltage supply means to said bypass device, and
  - (c) signal initiating means for selectively energizing said firing control circuit;
- said voltage supply means comprises an inverted capacitive potential device having a series stack of capacitor sections connected between the transmission line and ground potential with one of said capacitor sections proximate the transmission line having a potential transformer primary winding connected in parallel therewith, said potential transformer having a secondary winding connected for supplying stepped down voltage at line frequency to said firing control circuit.

2. The system of claim 1 wherein:
said bypass device firing control circuit comprises a second circuit branch connected across said capacitor and across said bypass device, said second circuit branch including an inductive element, a primary winding in transformer relation to said inductive element, an electronic switch device for controlling application of voltage to said primary winding, and means for causing voltage applied to said primary winding to be of higher frequency than said transmission line frequency.

3. The system of claim 2, wherein:
said firing control circuit also comprises a rectifier for producing direct voltage from voltage supplied by said voltage supply means, a firing control circuit storage capacitor for storing energy supplied by voltage from said rectifier, and said electronic switch device is arranged to discharge said storage capacitor upon application of signals from said signal initiating means.

* * * * *